United States Patent [19]
Hudson et al.

[11] 3,756,688
[45] Sept. 4, 1973

[54] METALLIZED COUPLER FOR OPTICAL WAVEGUIDE LIGHT SOURCE

[75] Inventors: Marshall C. Hudson, Corning; Felix P. Kapron, Elmira, both of N.Y.

[73] Assignee: Corning Glass Works, Corning, N.Y.

[22] Filed: Mar. 30, 1972

[21] Appl. No.: 239,517

[52] U.S. Cl. .......... 350/96 WG, 250/199, 350/96 B
[51] Int. Cl. .............................................. G02b 5/14
[58] Field of Search ................... 350/96 WG, 96 R, 350/96 B

[56] References Cited
UNITED STATES PATENTS

| | | | |
|---|---|---|---|
| 3,187,627 | 6/1965 | Kapany | 350/96 B X |
| 3,614,197 | 10/1971 | Nishizawa | 350/96 WG |
| 3,043,910 | 7/1962 | Hicks | 350/96 B X |
| 3,403,955 | 10/1968 | Jueneman | 350/96 R |
| 3,610,727 | 10/1971 | Ulrich | 350/96 WG |
| 3,659,915 | 5/1972 | Maurer et al. | 350/96 WG |

*Primary Examiner*—John K. Corbin
*Attorney*—Clarence R. Patty, Jr., William J. Simmons, Jr. et al.

[57] ABSTRACT

A light coupler for transferring optical wave energy to or from light transmitting means including at least one optical waveguide. The coupler comprises a tapered core of transparent material of refractive index $n_1$ and a layer of transparent cladding material of refractive index $n_2$ disposed upon the surface of the tapered core, $n_1$ being greater than $n_2$. The tapered core has a large diameter end which is aligned with an end of the light transmitting means and a small diameter end which is disposed adjacent to electro-optic energy conversion means such as a light emitting diode, a light detector or the like. A reflecting metallic layer is disposed upon at least that portion of the surface of the cladding layer which is adjacent to the small diameter end of the coupler to reflect light which is incident upon the core-cladding interface at angles less than the critical angle and which passes through the cladding layer.

19 Claims, 5 Drawing Figures

PATENTED SEP 4 1973  3,756,688
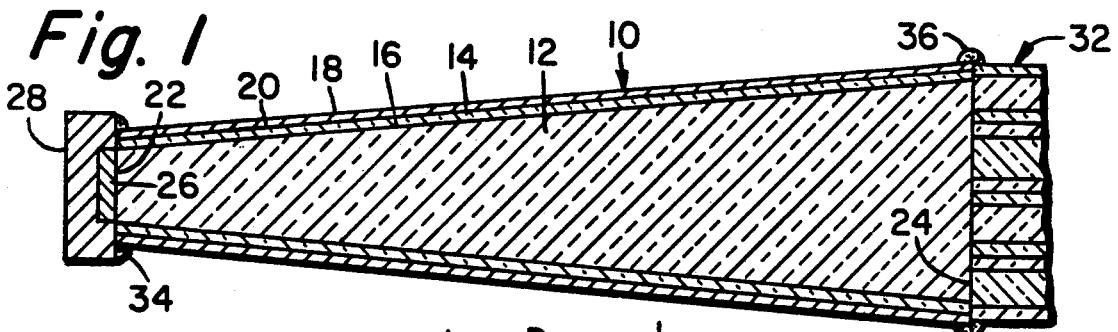
Fig. 1
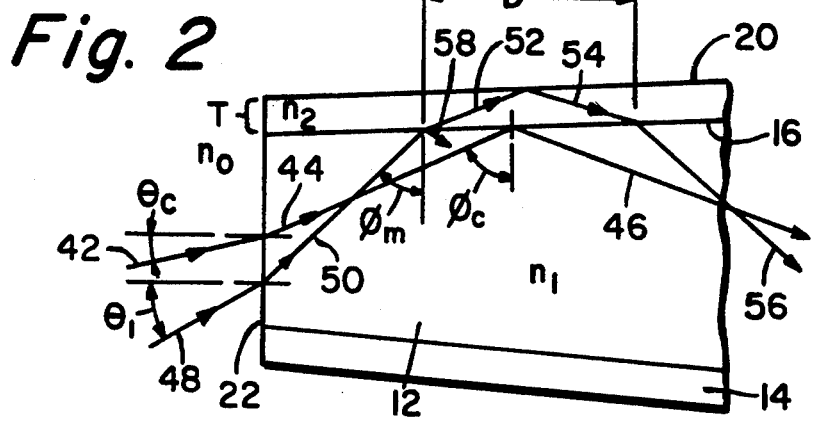
Fig. 2
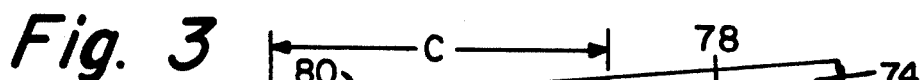
Fig. 3
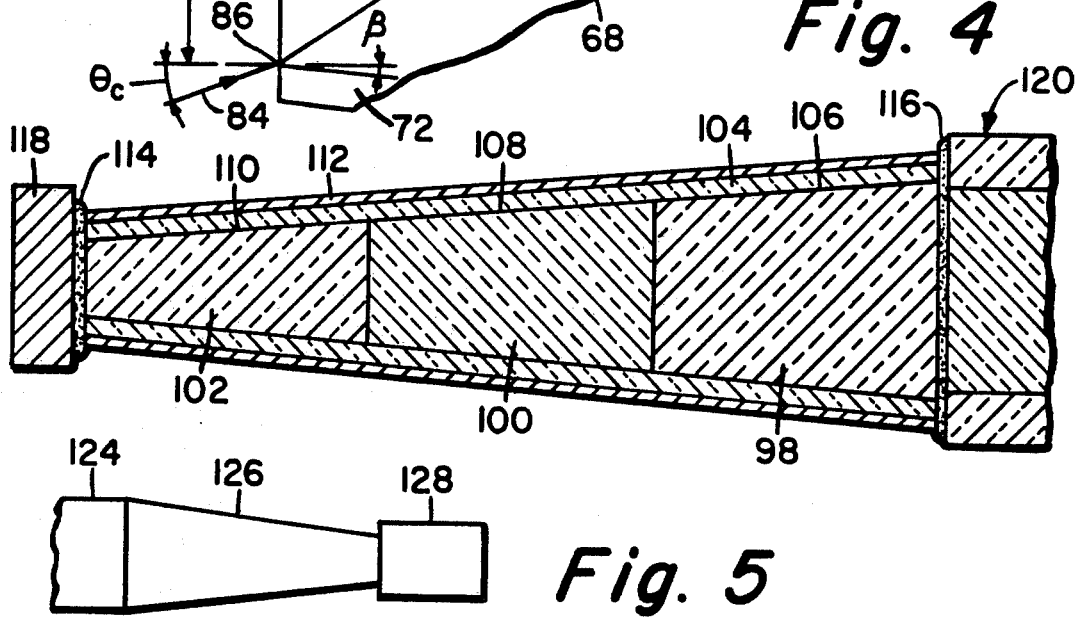
Fig. 4
Fig. 5

METALLIZED COUPLER FOR OPTICAL WAVEGUIDE LIGHT SOURCE

BACKGROUND OF THE INVENTION

The continually increasing amount of traffic that communication systems are required to handle has hastened the development of high capacity systems. Even with the increased capacity made available by systems operating between $10^9$ Hz and $10^{12}$ Hz, traffic growth is so rapid that saturation of such systems is anticipated in the very near future. High capacity communication systems operating around $10^{15}$ Hz are needed to accommodate future increases in traffic. These systems are referred to as optical communication systems since $10^{15}$ Hz is within the frequency spectrum of light. Conventional electrically conductive waveguides which have been employed at frequencies between $10^9$ and $10^{12}$ Hz are not satisfactory for transmitting information at carrier frequencies around $10^{15}$ Hz.

The transmitting media required in the transmission of frequencies around $10^{15}$ Hz are hereinafter referred to as "optical waveguides" which normally consist of an optical fiber having a transparent core having a refractive index $N_1$ surrounded by a layer of transparent cladding material having a refractive index $N_2$ which is lower than $N_1$. The diameter of the waveguide core may range from about the wavelength of light for a single mode waveguide up to about 1,000 $\mu m$ for multimode waveguides, the maximum diameter being limited by the stiffness of the fiber. Many multimode waveguides of current interest have core diameters less than 25 $\mu m$ since the bandpass of a waveguide decreases as the core size and the number of propagated modes increases. Since multimode waveguides which propagate only relatively few modes can carry much more information, such guides are preferred over those which propagate many thousands of modes. In some instances a plurality of waveguide fibers are disposed in side-by-side relation to form a fiber bundle in order to propagate to the receiver more light than can be carried by a single fiber. the light Light from the source is usually directed toward an endface of the optical fiber or fiber bundle. From a geometrical optics viewpoint, the meridional entrance cone in the external medium is limited to the half angle $\psi$ measured from the fiber axis, wherein $$\psi = \sin^{-1} \sqrt{(N^2_1 - N^2_2/N_o)} \quad (1)$$

where $N_o$ is the refractive index of the external material adjacent to the entrance face. The numerical aperture NA of such an optical fiber, which is a measure of the light gathering ability thereof, is defined as follows:

$$NA \equiv N_o \sin \psi = \sqrt{N^2_1 - N^2_2} \quad (2)$$

It has been well known in the art that light can be propagated along a transparent fiber structure having a higher refractive index than its surroundings. In such conventional optical fibers the ratio of the total diameter to the core diameter is almost unity, and the difference between refractive indices of the core and cladding material is made as large as possible. However, the total diameter to core diameter ratio of optical waveguide fibers is usually between about 10:1 and 300:1 for single-mode optical waveguides and is usually between about 1001:1000 and 10:1 for multimode optical waveguides, and the difference in indices of refraction is maintained small. In accordance with equation (2) this small difference between core and cladding refractive indices in optical waveguides results in a numerical aperture that is smaller than that of conventional optical fibers. Whereas the numerical aperture of commercial optical fibers or light pipes of the conventional type may be as high as about 0.6, the numerical aperture of an optical waveguide is usually about 0.1. Although optical waveguides of the type disclosed in copeninidg patent application Ser. No. 36,267 filed by D. B. Keck et al. on May 11, 1970, now U.S. Pat. No. 3,711,262 are capable of propagating light over long distances with relatively low attenuation, suitable means must be provided for efficiently coupling an optical source to such waveguides before a practical optical communication system can be realized.

Due to the relatively low acceptance angles or numerical apertures exhibited by optical waveguides, radiation from the waveguide light source must be highly directional to efficiently couple to the waveguide. A light coupler which receives light from a source, collimates the received light rays and couples them into a single optical waveguide or a bundle thereof is disclosed in application Ser. No. 239,744 entitled "Coupler for Optical Waveguide Light Source" filed by F. P. Kapron on even date herewith. The coupler disclosed in that application comprises a tapered core of transparent material of refractive index $n_1$ and a layer of transparent cladding material of refractive index $n_2$ disposed upon the surface of the tapered core, $n_1$ being greater than $n_2$. When the coupler is utilized at the transmitting end of an optical communication system, the large diameter end of the tapered core is aligned with an end of the light transmitting means in light coupling relationship therewith. Light rays from the source, which enter the samll diameter end of the tapered core and are incident upon the core-cladding interface at an angle greater than the critical angle, are reflected by the interface one or more times and are radiated from the large diameter end of the tapered core, each total internal reflection reducing the angle which the ray makes with the core axis by twice the taper half angle $\beta$ of the core. However, light rays which enter the small diameter end of the core and are incident upon the core-cladding interface at an angle smaller than the critical angle thereof pass through that interface and are thereby unavailable for initiation of light mode propagation in the light transmitting means. These unavailable or lost light rays limit the input NA of that coupler to the value indicated by the following equation $$NA_{in} = \sqrt{n^2_1 - n^2_2} \cos\beta + n_2 \sin\beta \quad (3)$$

Equation (3) clearly illustrates that the input numerical aperture of such a device is limited by the refractive indices of the core and cladding materials.

SUMMARY OF THE INVENTION

It is therefore an object of the present invention to provide a tapered light coupler of the type wherein the predominate mode of operation is based upon total internal reflection of light, but the amount of light propagated therethrough is not substantially limited by the refractive indices of the materials forming the total internal reflection interface.

The present invention relates to a light coupler which is useful in optical communication systems of the type comprising light transmitting means including an optical waveguide or a bundle thereof disposed in side-by-side to In accordance with the present invention the light coupler is characterized in that it comprises a tapered core of transparent material and a layer of cladding material disposed upon the surface of the core, the refractive index of the core material being greater than that of the cladding material. A reflecting metallic layer is disposed upon at least that portion of the surface of the cladding layer which is adjacent to the small diameter end of the coupler. Means are provided for supporting the large diameter end of the light coupler core adjacent to an end of the light transmitting means, and electro-optic energy conversion means is disposed adjacent to the small diameter end of the core.

BRIEF DESCRIPTION OF THE DRAWINGS

FIG. 1 is a cross-sectional view of a transmitting portion of an optical communication system including a light coupler constructed in accordance with the present invention.

FIG. 2 is a diagram illustrating the operation of the input end of the light coupler of the present invention.

FIG. 3 is a cross-sectional fragmentary illustration of a further embodiment of the present invention.

FIG. 4 is a cross-sectional view of a further embodiment of the present invention which utilizes a plurality of tapered core sections.

FIG. 5 shows the receiving portion of an optical communi-cation system which utilizes the light coupler of the present invention.

DESCRIPTION OF THE PREFERRED EMBODIMENTS

FIG. 1 is a cross-sectional view of the transmitting portion of an optical communication system which includes a light coupler 10 consisting of a tapered core 12 of transparent material having a refractive index $n_1$ surrounded by a layer 14 of transparent cladding material having a refractive index $n_2$ which is lower than $n_1$. An interface 16 exists between core 12 and cladding layer 14. A metallic layer 18, which is disposed upon the surface of cladding layer 14, provides a light reflecting surface 20. Core 12 has a small diameter endface 22 and a large diameter endface 24 which are preferably optically polished. The diameter of endface 22 may be made large enough to encompass the light emitting area 26 of diode 28, and that of endface 24 may be chosen to approximate the diameter of the effective area of the light transmitting means with which the light coupler is associated. When the transmitting means is a single optical waveguide, the effective light transmitting area thereof is the area of the core and that portion of the cladding adjacent to the core wherein a significant amount of evanescent energy exists. When the transmitting means is a fiber bundle such as fiber bundle 32, the effective area is substantially the entire cross-sectional area thereof. Coupler 10 may be affixed to diode 28 and fiber bundle 32 by beads 34 and 36, respectively, of bonding material.

Both core 12 and cladding layer 14 may be made of any material such as glass, plastic or the like having the required light transmitting properties and relative refractive indices. For example, the core may be formed of a flint glass having a refractive index of 1.75 and the cladding may be formed of a crown glass having a refractive index of 1.52. Core 12 could also be made of the same material as the core or cores of the associated optical waveguide or bundle. Thus, if the optical waveguide bundle 32 is made of materials set forth in the aforementioned Keck et al. patent, core 12 could be formed of doped fused silica, and cladding layer 14 could be pure fused silica. It will be shown that fused silica can be advantageously used in an embodiment wherein the refractive index of the light coupler core varies along the length thereof.

The most efficient transfer of light occurs when the coupler endfaces 22 and 24 are in direct contact with the elements disposed adjacent thereto. The diagram of FIG. 2 illustrates the effect of light emitted by an LED which is in contact with coupler 10. Only core 12 and cladding layer 14 are illustrated in this figure which contains the symbols $n_1$, $n_2$ and $n_o$ as representing the refractive indices of the core and cladding materials and the LED, respectively. Since the refractive index of an LED is very high, $n_o$ will be greater than $n_1$ and a ray incident upon endface 22 at an angle $\theta$ which is greater than the critical angle $\theta_o$ will reflect from rather than enter endface 22 where $$\theta_o = \sin^{-1}(n_1/n_o)$$

(4)

If a ray is incident upon endface 22 at an angle $\theta$ which is less than $\theta_o$, it will enter core 12 and refract away from the normal. Some light rays which propagate through core 12 will not strike interface 16 and will pass through coupler 10 with their angular orientation being unaffected thereby.

The situation wherein a ray is incident upon endface 22 at an angle which is less than $\theta_o$, but which is sufficiently large that the refracted ray reflects at least once from interface 16, can be described by the equation $$n_o \sin\theta = n_1 \cos(\phi-\beta)$$

(5)

where $\phi$ is the angle that the refracted ray makes with the normal to interface 16 and $\beta$ is the taper half angle of core 12. As the angle $\theta$ increases, the angle $\phi$ decreases, and eventually, a critical value $\phi_c$ is reached beyond which a refracted ray will pass through interface 16, where $\phi_c$ is given by $$\phi_c = \sin^{-1}(n_2/n_1)$$

(6)

Equation (5) is relevant to a discussion of coupler 10 only if the critical angle $\phi_c$ is equal to or greater than the taper half angle $\beta$, a condition which exists for typical values of $n_1$ and $n_2$.

In the aforementioned Kapron application Ser. No. 239,744 it is the critical angle $\phi_c$ which limits the input numerical aperture of the coupler having a given taper half angle $\beta$. Since the angle $\phi_c$ is a function of refractive indices $n_1$ and $n_2$, the input NA is limited by the values of $n_1$ and $n_2$ as indicated by equation (3), $NA_{in}$ being less for smaller differences between $n_1$ and $n_2$.

The coupler of the present invention functions in a manner similar to that of the aforementioned Karpon application for refracted rays which are incident upon interface 16 at angles equal to or greater than the angle $\phi_c$. FIG. 2 shows a critical ray 42 incident upon endface 22 at an angle $\theta_c$, the refracted ray 44 being incident upon interface 16 at the critical angle $\phi_c$. Ray 44 reflects from interface 16 by the process of total internal reflection to form reflected ray 46. However, the input NA of coupler 10 is not limited to the value obtained from equation (3) since rays incident upon interface 16 at angles less than critical angle $\phi_c$ only partially reflect from said interface, a component of such rays passing through said interface and being reflected from metallic surface 20. Thus, ray 48, which is incident upon endface 22 at an angle $\theta_1$, where $\theta_c \le \theta_1 \le \theta_o$, is refracted toward interface 16 at an incidence angle less than $\phi_c$. Refracted ray 50 is only partially reflected by interface 16 as illustrated by ray 58, and some portion thereof escapes into cladding layer 14. That portion of the height entering layer 14, which is indicated as ray 52, undergoes a metallic reflection, resulting in a reflected ray 54 which refracts and enters core 12 as ray 56. Although the efficiency of a metallic reflection is only about 90 percent as compared to unity for a total internal reflection, ray 52 would be completely lost if it were not for the presence of metallic reflecting surface 20. Ray 56 will suffer a longitudinal displacement D with respect to ray 50, where $$D = 2T \cos \beta \frac{n_1 \sin \phi_m}{\sqrt{n_2^2 - n_1^2 \sin^2 \phi_m}} \quad (7)$$

where $T$ is the thickness of cladding layer 14, and $\phi_m$ is an angle less than the angle $\phi_c$ at which ray 50 is incident upon interface 16. Ray 56 will also have its angle with respect to the longitudinal axis of core 12 reduced by $2\beta$ as compared to ray 50. The subsequent reflection of ray 56 may be another metallic reflection, or if the incidence angle has sufficiently increased, the next reflection may be a total internal reflection. Due to the ability of the coupler of the present invention to reflect by the process of metallic reflection that light which enters the cladding layer, the input NA is no longer a fundamental limitation on the efficiency of the coupler. The use of metallic layer 18 is especially important when the difference between the refractive indices of core 12 and cladding layer 14 is small, since the critical angle $\phi_c$ is about 82° for a fiber having a 1 percent core-cladding index difference.

FIG. 3 illustrates another embodiment of the present invention in which tapered core 68 has disposed upon that portion of the surface thereof adjacent to endface 70 a metallic layer 72, a layer 74 of transparent cladding material being disposed upon the remaining portion of the core surface. Cladding layer 74 forms an interface 78 with core 68, and metallic layer 72 forms a metallic reflecting surface 80. Metallic layer 72 extends from endface 70 a distance C which is determined as follows. A light ray 84 enters the edge of endface 70 at point 86, making an angle $\theta_c$ with respect to the local normal at endface 70, and the resulting refracted ray 88 is directed toward interface 78 at the critical angle $\phi_c$. Any ray entering point 86 and being incident upon interface 78 at an angle equal to or greater than the angle $\phi_c$ will reflect therefrom by the process of total internal reflection. Any ray entering point 86 and being incident upon reflecting surface 80 will reflect by the process of metallic reflection. Since ray 88 is an extreme ray in that no ray can enter interface 70 and impinge upon the surface of core 68 at an axial distance greater than that achieved by ray 88, the distance C is taken to be that axial distance at which ray 88 reaches the surface of core 68. Distance C can be determined on a geometrical basis to be $$C = A \cos \beta \left( \frac{n_2 \cos \beta}{\sqrt{n_1^2 - n_2^2}} - \sin \beta \right) \quad (8)$$

where $A$ is the diameter of endface 70, $\beta 0$ is the taper half angle of core 68 and $n_1$ and $n_2$ are the refractive indices of the core 68 and cladding layer 74, respectively.

The figures depicting the various embodiments are not drawn to scale but are shown in such a manner as to illustrate the present invention. For example, the core taper need not be perfectly linear as illustrated. However, couplers having substantially linearly tapering cores can be obtained by heating a large diameter fiber and drawing the same in accordance with techniques well known in the fiber optic fabrication art. By controlling the temperature and the pulling force, the desired taper angle can be achieved. Moreover, the thickness of the cladding layer need not be constant, and probably will not be perfectly constant if the light coupler is made by the aforementioned drawing process. The thickness of the transparent cladding layers should be great enough to prevent any significant amount of evanescent energy from reaching the outer surface thereof. This minimum cladding thickness is determined by the refractive indices of the transparent core and cladding materials and is usually no less than about ten times the wave-length of light propagation through the device.

In the above described embodiments the light coupler core consists of a homogeneous element, the refractive index of which is constant throughout its length. However, each end of core 12 of FIG. 1 has its own refractive index requirements. The refractive index of core 12 in the vicinity of endface 22 should be as high as possible so that light rays which enter endface 22 and are incident upon interface 16 at small angles with respect to the normal thereto are reflected from that interface by total internal reflection since that type of reflection is more efficient than metallic reflection. The refractive index of that portion of core 12 at endface 24 should be similar to that of the core material in the light trans-mitting medium to provide maximum coupling efficiency at that interface. To illustrate this problem, assume that the core material of the light transmitting means is made from doped fused silica and has a refractive index less than 1.5. If core 12 had a refractive index of about 1.5 in order to provide good coupling efficiency between coupler 10 and the light transmitting means, much of the light incident upon interface 16 near entrance face 22 would pass into cladding layer 14. This problem can be overcome by providing a coupler core having a refractive index which varies either gradually or in a stepped fashion. For example the embodiment of FIG. 1 could utilize a core fabricated by the technique described in U. S. Pat. application Ser. No. 239,702 entitled "Optical Waveguide Light Source Coupler" filed by F. P. Kapron and D. B. Keck on even date herewith. That application describes a process whereby a boule of doped fused silica is formed by a flame hydrolysis process, the amount of dopant present in the boule being relatively low at one end and gradually increasing toward the other end of the boule. Thus, the refractive index of that end of core 12 adjacent to endface 24 could be about 1.462 and the refractive index of the core could gradually increase toward endface 22 where increased dopant concentration causes a maximum refractive index.

In the embodiment illustrated in FIG. 4 the coupler core consists of sections 98, 100 and 102 which are named in order of increasing refractive index. Cladding layer 104 makes an interface 106 with section 98, an interface 108 with section 100 and an interface 110 with section 102. A reflecting metallic layer 112 is disposed upon the surface of layer 104. In this embodiment, thin transparent layers 114 and 116 bond the coupler to light source 118 and optical waveguide 120, respectively. Layers 114 and 116 may consist of epoxy or other suitable transparent bonding material having a refractive index approaching that of the materials disposed adjacent thereto.

Since section 102 has a relatively high refractive index, the critical angle at interface 110 is relatively small and even those light rays entering the entrance face of section 102 that is adjacent ot layer 114 and being incident upon interface 110 at relatively small incidence angles are totally internally reflected. As shown hereinabove, each reflection which a light ray undergoes reduces the angle which the reflected ray makes with the longitudinal axis of the coupler by twice the taper half angle $\beta$. Therefore, after a ray reflects a number of times from metallic layer 112 and/or interface 110, it can enter section 100 and reflect from interface 108 even though the refractive index difference between section 100 and cladding layer 104 is not as great as the difference between section 102 and cladding layer 104. Similarly, the ray enters section 98 making an even smaller angle with respect to the longitudinal axis of the coupler after having undergone a number of reflections within previous sections. Section 98 can be made from doped fused silica having a refractive index approaching that of the core of waveguide 120, thus providing good coupling efficiency between the light coupler and that waveguide.

FIG. 5 shows the receiver portion of an optical communication system including light transmission means 124 having a light coupler 126 disposed adjacent to the end thereof. Output coupler 126 may be constructed in a manner similar to any of the input couplers described hereinabove. Light detector 128 is disposed immediately adjacent to the small diameter end of coupler 126.

The cross-sectional shape or configuration of optical waveguides and fiber bundles is substantially circular, and it is therefore preferred that the cross-sectional shape of the larger end of the light coupler also be circular. However, this portion of the coupler could have any desired shape depending upon the shape of the waveguide or waveguide bundle to which it is connected. Similarly, the input or smaller end of the light coupler could be elliptical or elongated in some ohter manner depending upon the shape of the light emitting area of the light source. For example the smaller end of the coupler could be elliptical in cross-section and the larger end could be circular.

We claim:

1. An optical communication system comprising light transmitting means including at least one optical waveguide for propagating optical wave energy,
    a light coupler having a tapered core of transparent material and a layer of transparent cladding material disposed upon at least a portion of the surface of said core, the refractive index $n_1$ of said core material being greater than the refractive index $n_2$ of said transparent cladding material, and a reflecting metallic layer surrounding at least that portion of said core which is adjacent to the small diameter end of said coupler, said metallic layer forming a smooth interface that is reflective to most of said optical wave energy that is incident thereon,
    means for supporting the large diameter end of said core adjacent to an end of said light transmitting means so that said core is aligned with the light transmitting area of said light transmitting means, and
    electro-optic energy conversion means disposed adjacent to the small diameter end of said core.

2. An optical communication system in accordance with claim 1 wherein said transparent cladding layer is disposed upon the entire surface of said tapered core and said metallic layer is disposed upon the surface of said cladding layer.

3. An optical communication system in accordance with claim 1 wherein said metallic layer is disposed directly upon that portion of the surface of said core extending from the small diameter end of said coupler an axial distance C which is determined by the equation $$C = A \cos \beta \left( \frac{n_2 \cos \beta}{\sqrt{n_1^2 - n_2^2}} - \sin \beta \right)$$

where A is the diameter of the small diameter end of said core and $\beta$ is the taper half angle of said core, said transparent cladding layer being disposed upon that portion of the surface of said core that is not covered by said metallic layer.

4. An optical communication system in accordance with claim 1 wherein said light coupler is disposed at the input end of said transmitting means, said electro-optic energy conversion means comprising light source means for directing light into the small diameter end of said core.

5. An optical communication system in accordance with claim 1 wherein said light transmitting means comprises a bundle of optical waveguides disposed in side-by-side relation.

6. An optical communication system in accordance with claim 1 wherein said light transmitting means comprises a single optical waveguide, the core of which is substantially aligned with the large diameter end of said tapered core.

7. An optical communication system in accordance with claim 1 wherein the refractive index of said tapered core varies throughout the length thereof, the refractive index at the large diameter end of said tapered core being less than that at the small diameter end thereof.

8. An optical communication system in accordance with claim 7 wherein the refractive index of said tapered core varies gradually.

9. An optical communication system in accordance with claim 7 wherein said tapered core consists of a plurality of segments, each having a refractive index different from the adjacent segment.

10. An optical communication system in accordance with claim 1 wherein said coupler is disposed at the output end of said light transmitting means, said electro-optic energy conversion means comprising means for detecting light radiating from the small diameter end of said coupler.

11. In an optical communication system of the type wherein optical wave energy is propagated through light transmitting means including at least one optical waveguide, a light coupler comprising a tapered core of transparent material and a layer of transparent cladding material disposed upon a portion of the surface of said core extending from the large diameter end thereof, the refractive index of said core material being greater than that of said transparent cladding material, a reflecting metallic layer disposed upon the exposed portion of said core, the junction between said metallic layer and said transparent cladding layer being located an axial distance C from the small diameter end of said core, C being given by the equation $$C = A \cos \beta \left( \frac{n_2 \cos \beta}{\sqrt{n_1^2 - n_2^2}} - \sin \beta \right)$$

where $A$ is the diameter of the small diameter end of said core, $\beta$ is the taper half angle of said core and $n_1$ and $n_2$ are the refractive indices of the core and transparent cladding layer, respectively, means for supporting the large diameter end of said core adjacent to an end of said light transmitting means so that said core is aligned with the light transmitting area of said light transmitting means, and electro-optic energy conversion means disposed adjacent to the small diameter end of said core.

12. An optical communication system in accordance with claim 11 wherein said light coupler is disposed at the input end of said light transmitting means, said electro-optic energy conversion means comprising light source means for directing light into the small diameter end of said core.

13. An optical communication system in accordance with claim 11 wherein said coupler is disposed at the output end of said light transmitting means, said electro-optic energy conversion means comprising means for detecting light radiating from the small diameter end of said coupler.

14. In an optical communication system of the type comprising
light transmitting means including at least one optical waveguide,
a source of optical wave energy, and
a light coupler having an input end for receiving light from said source and an output end for emitting light into said at least one waveguide,
said coupler being characterized in that it comprises
a tapered core of transparent material, said tapered core having a small diameter end at the input end of said coupler which is adapted to receive light from said source, and a large diameter end at the output end of said coupler,
a layer of transparent cladding material disposed upon the surface of said core, the refractive index of said tapered core material being greater than that of said transparent cladding material,
a reflecting metallic layer disposed upon the surface of said transparent cladding layer and forming therewith a smooth interface that is reflective to most of said optical wave energy, and
means for supporting the large diameter end of said tapered core adjacent to an end of said light transmitting means so that said tapered core is aligned with the light transmitting area of said light transmitting means and light radiating from said coupler initiates the propagation of light waves in said light transmitting means.

15. An optical communication system in accordance with claim 14 wherein the refractive index of said tapered core varies throughout the length thereof, the refractive index at the large diameter of said tapered core being less than that at the small diameter end thereof.

16. An optical communication system in accordance with claim 15 wherein the refractive index of said tapered core varies gradually.

17. An optical communication system in accordance with claim 15 wherein said tapered core consists of a plurality of segments, each having a refractive index different from the adjacent segment.

18. An optical communication system in accordance with claim 1 wherein the reflection efficiency of said interface is about 90 percent.

19. An optical communication system in accordance with claim 14 wherein the reflection efficiency of said interface is about 90 percent.

* * * * *